June 8, 1937.  G. A. MAU  2,083,076
METHOD FOR DISSOLVING DELIQUESCENT MATERIAL
Original Filed Feb. 26, 1934
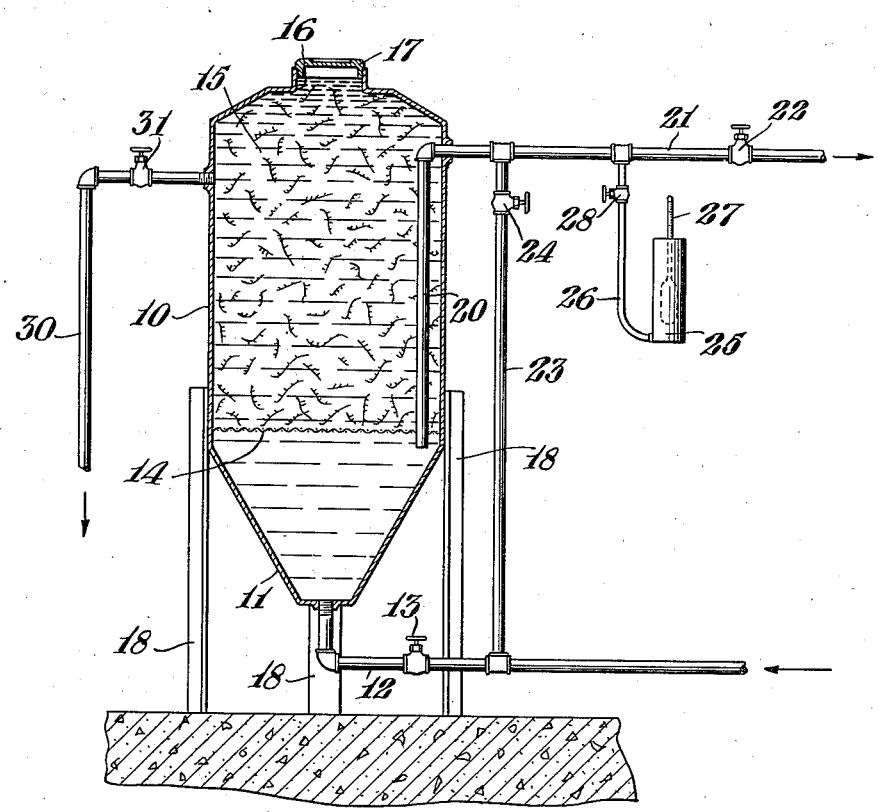
Inventor
George A. Mau
By Bates, Golrick, & Teare
Attorneys Patented June 8, 1937

2,083,076

UNITED STATES PATENT OFFICE 2,083,076

METHOD FOR DISSOLVING DELIQUESCENT MATERIAL

George A. Mau, Lakewood, Ohio, assignor to The Coal Treating & Equipment Company, Cleveland, Ohio, a corporation of Ohio Original application February 26, 1934, Serial No. 712,861. Divided and this application November 5, 1934, Serial No. 751,661

1 Claim. (Cl. 23—268)

This invention relates to a method for dissolving deliquescent material, such as calcium chloride, to form a solution that can be sprayed in the form of a mist on coal or other surfaces, to render them dustless, and is a division of my copending application, Serial No. 712,861 filed Feb. 26, 1934. Heretofore, the dissolving of deliquescent material has been accomplished in a tank, which operated at atmospheric pressure to dissolve the chemical and which necessitated a pump of some sort to force the dissolved material to the work. In many cases, the apparatus has included an agitator, which was deemed advisable to maintain a uniform density of solution. Such apparatus not only has a high initial cost, but necessitates considerable attention so as to obtain the desired degree of density at all times.

An additional objection to the present equipment is the fact that it has been necessary to use a high capacity tank in order to obtain uninterrupted service for the method of dissolving has required about one-half hour before the charge would be ready for use.

An object of my invention is to provide a method for dissolving a deliquescent material, so as to eliminate all moving parts, pumps, motors and the like, and to obtain a uniform density of solution at all times. An important advantage of my invention is the fact that the method may be carried out with apparatus which is extremely simple, and therefore, may be installed economically in many coal yards in which heretofore the initial cost and operating investment of a dissolving plant were regarded, as prohibitive.

An additional object of my invention is to obtain a method by means of which a charge may be dissolved within a few minutes, so that it is not necessary to use high capacity apparatus, nor to provide a plurality of tanks in order to insure substantially uninterrupted service.

In the drawing, I have shown a vertical section through a tank, which is constructed in accordance with my invention, and in such view the tank is indicated at 10, as having a substantially cylindrical body portion and a substantially conical bottom 11 at the apex end of which the inlet supply conduit 12 is connected. Water from the usual service line is thus led into the tank from the bottom and is controlled by a valve 13. A screen 14 is disposed across the tank, near the region of the upper end of the conical portion for supporting the chemical 15 which is inserted in solid form through an opening 16 at the top of the tank. A closure 17 is arranged to be sealed in place, as by a threaded connection, so as to permit a pressure to be built up within the tank in accordance with that of the water supply line. The tank may be supported on legs 18 which are fastened to it in any convenient manner, such as by welding.

As the water rises in the tank, the chemical immediately adjacent the screen is first dissolved and the solution gradually fills the lower portion of the tank, and as the chemical on the bottom dissolves, that above it progressively falls by gravity so that there is a continuous dissolving operation in progress so long as the dissolved material is being withdrawn for use.

To assure withdrawal only of dissolved material, I utilize a discharge pipe 20, which in the preferred arrangement extends downwardly through the tank, and has the entrance thereof within the portion of the tank below the screen. Pressure of liquid within the tank thus forces the dissolved material up the pipe 20, and thence through pipe 21, from whence it is led to any number of discharge locations throughout the yard. A valve 22 controls the rate of discharge.

To insure uniformity of density at all times, I have provided a fresh water by-pass conduit 23, which connects the supply line to the discharge line, and is controlled by a valve 24. This permits the dissolved material to be diluted, if a dilution is necessary. For the purpose of providing a visual indicator of the density, I have shown a hydrometer well 25, which is adapted to be connected to the discharge line by a conduit 26 and to receive a hydrometer 27. A valve 28 controls the flow of solution into the well. Thus, by means of the by-pass and hydrometer, an operator can quickly control the density to suit any particular need.

After a charge of chemical has been dissolved, it is only necessary to remove the closure and to refill the container. Inasmuch however, as the tank is under pressure, and inasmuch as the introduction of chemical would replace some of the liquid in the tank, I prefer to utilize a drain conduit 30, which is controlled by a valve 31. The position of the connection between the drain conduit 30 and the tank is predetermined, so as to permit charging of the container with chemical without causing the water therein to rise and overflow through the opening 16. At the completion of the recharge, the closure 17 is replaced, the valve 13 is opened and in a few minutes the solution is again ready for use.

I have found that the size of the tank and the position of the screen with reference to it produces a density of a definite amount and that such density can thus be predetermined for any yard in which the material is to be used. For example, I have found that a tank having a diameter of twenty-eight inches and a height of fifty-four inches will hold approximately five hundred pounds of calcium chloride in flake form, if the screen is placed approximately twenty-two inches from the bottom of the tank, and if the conical portion starts two inches below the screen. This partition will produce a solution having a specific gravity of 1.230 which is a satisfactory density for treating coal to render it dustless.

A tank having the dimensions cited will operate satisfactorily to dissolve approximately ten gallons per minute. If such discharge rate is restricted, the density is apt to increase, and so the by-pass valve 24 may then be opened, so as to dilute the solution, and thus to maintain the desired uniformity of density at all times.

The automatic replenishment of water in the tank at the same rate and at the same time at which the solution is discharged, results from the fact that the fresh water supply is open at all times to the tank, and also from the fact that a pressure is thereby built up within the tank. The fresh water supply is continuous so long as solution is being drawn from the tank and the supply is maintained at substantially the same rate as withdrawal.

My invention has made a remarkable advance in the art of dissolving calcium chloride and other deliquescent materials, for it has entirely eliminated the need for all moving parts and electrical apparatus. Accordingly, it does not require skilled labor for operation, and is therefore, extremely economical to use. The initial investment in this plant is extremely small in comparison to that heretofore required, and as a result, the use of calcium chloride for dust-proofing purposes has been extended to unexpected fields.

I claim:

A method of dissolving calcium chloride comprising supporting a quantity of such material upon and over the foraminous portion of a screen extending across a closed container, the container being so arranged that an unrestricted chamber is formed beneath said support, maintaining a body of water under service water pressure substantially above atmospheric pressure within the container, in contact with a substantial amount of the calcium chloride to form a solution thereof, admitting water into said chamber at a point remote from and underneath said screen and withdrawing the solution of calcium chloride at a point adjacent to the screen but offset from the point of entrance of the water.

GEORGE A. MAU.